(12) United States Patent
Sivasubramanian et al.

(10) Patent No.: US 8,802,769 B2
(45) Date of Patent: Aug. 12, 2014

(54) MEDIUM FOR THE STABILIZATION AND UTILITY OF VOLATILE OR LIQUID HYDRIDES OF BORON

(75) Inventors: PremKumar Sivasubramanian, Ann Arbor, MI (US); Narayanankutty Pariyadath, Winston Salem, NC (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 220 days.

(21) Appl. No.: 13/343,942

(22) Filed: Jan. 5, 2012

(65) Prior Publication Data

US 2013/0174477 A1 Jul. 11, 2013

(51) Int. Cl.
*A01N 25/34* (2006.01)
*C08L 83/00* (2006.01)

(52) U.S. Cl.
USPC .......................................... 524/588; 524/404

(58) Field of Classification Search
USPC ................................. 524/404, 588
See application file for complete search history.

(56) References Cited

U.S. PATENT DOCUMENTS

| | | | |
|---|---|---|---|
| 5,305,714 A | | 4/1994 | Sekiguchi et al. |
| 6,458,881 B1 * | | 10/2002 | Pan et al. ...................... 524/490 |
| 6,645,651 B2 | | 11/2003 | Hockaday et al. |
| 6,733,725 B2 | | 5/2004 | Zaluska et al. |
| 7,052,671 B2 | | 5/2006 | McClaine et al. |
| 7,594,939 B2 | | 9/2009 | Goldstein et al. |
| 7,790,013 B2 | | 9/2010 | McClaine et al. |
| 2002/0049274 A1 * | | 4/2002 | Azechi et al. ................. 524/440 |
| 2003/0045626 A1 * | | 3/2003 | Tamori et al. ................. 524/547 |
| 2005/0175868 A1 | | 8/2005 | McClaine et al. |
| 2005/0215708 A1 | | 9/2005 | Robertson |
| 2006/0199911 A1 * | | 9/2006 | Markovich et al. ........... 525/192 |
| 2007/0243431 A1 | | 10/2007 | Zhu et al. |
| 2008/0112909 A1 | | 5/2008 | Faler et al. |
| 2008/0138674 A1 | | 6/2008 | Pez et al. |
| 2008/0220297 A1 | | 9/2008 | Sarata et al. |
| 2008/0241637 A1 * | | 10/2008 | Burdzy ........................... 429/36 |
| 2009/0060833 A1 * | | 3/2009 | Curello et al. ............. 423/658.2 |
| 2009/0302269 A1 | | 12/2009 | Choi et al. |
| 2010/0108543 A1 | | 5/2010 | Tokiwa et al. |
| 2010/0178520 A1 * | | 7/2010 | Kneafsey et al. ............. 428/448 |

FOREIGN PATENT DOCUMENTS

WO WO 2007/096857 A1 8/2007

OTHER PUBLICATIONS

John J. Vajo, et al., "Reversible Storage of Hydrogen in Destabilized $LiBH_4$," Journal of Physical Chemistry B letters, vol. 109, 3719-3722, 2005).
H. I. Schlesinger, "The Preparation of Other Borohydrides by Metathetical Reactions Utilizing the Alkali Metal Borohydrides[1]" (J. Am. Chem. Soc.: vol. 75, 209, 1953).
International Search Report and Written Opinion issued Mar. 21, 2013 in PCT/US2013/020101 filed Jan. 3, 2013.

* cited by examiner

*Primary Examiner* — Alexander Kollias
(74) *Attorney, Agent, or Firm* — Oblon, Spivak, McClelland, Maier & Neustadt, L.L.P.

(57) ABSTRACT

A stabilized composition containing a metal hydride of boron, including complex metal hydrides of boron, in a polyalkylsiloxane amorphous fumed silica mixture is provided. In a preferred embodiment the composition is a stabilized mixture of aluminum borohydride, polydimethylsiloxane and amorphous fumed silica. A method to prepare the stabilized mixture is also provided.

13 Claims, No Drawings

MEDIUM FOR THE STABILIZATION AND UTILITY OF VOLATILE OR LIQUID HYDRIDES OF BORON

BACKGROUND OF THE INVENTION

Environmentally friendly fuels, e.g., alternative fuels to hydrocarbon-based energy sources, are currently of great interest. Hydrogen is a fuel which is prominent as an alternative fuel and the subject of considerable research effort directed to making it commercially competitive with hydrocarbon-based fuels. However, hydrogen is volumetrically inefficient to store and transport. For compact storage, hydrogen must be compressed to high pressure and stored in specialized tanks. For example, current systems may store hydrogen under 5,000 or 10,000 psi pressure. However, at 10,000 psi the hydrogen storage density is only 0.035 g/cm$^2$. Consequently, storage of hydrogen under high pressure is inefficient.

Hydrogen can be stored in liquid form at very low temperatures, but such storage is energy inefficient because a portion of the available energy of the system must be consumed in the liquefaction process. Moreover, liquid hydrogen is highly volatile and losses of the stored liquid hydrogen due to boil off are considerable and thus storage and transport as a liquid is ineffective to serve as an efficient fuel supply especially for utility to supply a commercial vehicle.

As a result, other methods to store and transport hydrogen are under investigation. Chemical hydrides have been proposed as effective hydrogen storage materials for a variety of applications in both distributed power generation and transportation applications. In particular, complex metal hydrides, such as borohydrides or alanates are of interest as materials for storage of hydrogen in the solid state. The theoretical hydrogen volumetric storage capacity in lithium borohydride is approximately 0.12 g/cm$^2$, more than twice the density of gaseous hydrogen under 10,000 psi.

The goal in the study of hydrogen storage materials is to develop candidates that possess high gravimetric hydrogen storage potential. Chemical hydrides, including alkali metal hydrides, alkali metal aluminum hydrides and alkali metal borohydrides, generate hydrogen through a hydrolysis reaction in water resulting in gravimetric hydrogen densities that range from 9 to 25 weight percent of the hydride. When the waters of reaction and solvation are taken into account, the combined hydrolysis systems have gravimetric hydrogen densities that range from 4 to 9 wt. percent.

Although current reported research efforts are focused on enhancing the gravimetric storage density and lowering the dehydrogenation and hydrogenation thermal barriers in the metal hydrides, the systems under investigation are far from achieving sought storage capacity targets due to high temperatures which are required to release the chemically bonded hydrogen, the slow kinetics of the release reaction, potential formation of harmful fuel cell contaminants and irreversibility under moderate hydrogenation conditions of these systems.

For example, Vajo et al. (Journal of Physical Chemistry B letters, 109, 3719-3722, 2005) showed that combining lithium borohydride and magnesium hydride at 2:1 molar ratio, respectively allowed for reversibility of lithium borohydride at lowered temperature compared to the neat compound and attributed this to the formation of magnesium boride following dehydrogenation of this system. However, the decomposition of magnesium hydride and lithium borohydride occurred at discreet decomposition temperatures that were expected from the neat compounds and no decomposition or destabilization was observed or reported. Also, reversibility was achieved only under severe conditions of 100 bar H$_2$ at 230° C. and the reversibility was extremely kinetically limited.

WO Publication No. 2007/096857 to Goldstein et al. describes a solid phase hydrogen-generating system utilizing a solid chemical hydride fuel selected from the group consisting of sodium borohydride, lithium borohydride, magnesium hydride and calcium hydride. The fuel is encapsulated in a plurality of removable capsules which are pumpable and have a major axis of up to 40 mm. The described fuels include water-soluble borohydrides such as sodium borohydride, and certain water insoluble hydrides including magnesium hydride and calcium hydride. The fuel is in a solid phase form encapsulated with polymers such as rigid or flexible plastics, metals, elastomers, water soluble plastics, resins, waxes, oxides or gels. Silica oxide is listed as an example of an oxide.

U.S. Pre-Grant Publication No. 2010/0108543 to Tokiwa et al. describes a resin composition including a curable silicone resin and a hydrogen storage alloy powder. The hydrogen storage powders are mixed metal alloys.

U.S. Pre-Grant Publication No. 2009/0302269 to Choi et al. describes a controlled foaming composition of hydrogen releasing materials. The foam suppression reagent may be any of celluloses; starches; siloxane polymers; polyvinylalcohols; polyvinylidenes; polypyrroles; polylactones; polycarbonates; polystyrenes; and polysaccharides. Described as hydrogen releasing materials are ammonia borane and lithium borohydride.

U.S. Pre-Grant Publication No. 2009/0060833 to Curello et al. describes a gel form of solid borohydride fuels, having a solid metal hydride and catalyst formed into a single solid member, which is inserted into the gel. The gels are based on a wide list of vinyl polymers including a vinyl-terminated polymethylsiloxane.

U.S. Pre-Grant Publication No. 2008/0220297 to Sarata et al. describes a hydrogen generator containing a complex hydride such as sodium borohydride and a catalyst. A silicone-based anti-foaming agent may be incorporated as an anti-foaming agent.

U.S. Pre-Grant Publication No. 2008/0138674 to Pez et al. describes an apparatus for dispensing a solid fuel carrier to a recipient vehicle. A lanthanum nickel hydride (LaNiH$_5$) silicone oil slurry solid fuel is referenced.

U.S. Pre-Grant Publication No. 2007/0243431 to Zhu et al. describes hydrogen-generating, solid fuel cartridge. Borohydrides including aluminum borohydride are described as a hydrogen generator.

U.S. Pre-Grant Publication No. 2005/0175868 to McClaine et al. describes a slurry composition containing a carrier liquid; a dispersant; and a chemical hydride. The carrier liquid includes an organic liquid such as a light mineral oil. Lithium hydride, lithium borohydride, lithium aluminum hydride, sodium hydride, sodium borohydride, sodium aluminum hydride, magnesium hydride, and calcium hydride are listed as chemical hydrides.

U.S. Pat. No. 7,790,013 to McClaine et al. describes metal hydride slurry of magnesium, magnesium hydride, a carrier liquid and optionally, a dispersant. The carrier liquid could include fluorinated hydrocarbons, such as perfluorodecane, silicone based solvents, saturated organic liquids, such as undecane, iso-octane, octane and cyclohexane, or mixtures of high boiling point hydrocarbons such as kerosene.

U.S. Pat. No. 7,594,939 to Goldstein et al. describes a solid phase hydrogen-generating system utilizing a solid chemical hydride fuel selected from the group consisting of sodium borohydride, lithium borohydride, magnesium hydride and calcium hydride, wherein the fuel is encapsulated in a plurality of removable capsules.

U.S. Pat. No. 7,052,671 to McClaine et al. describes a composition comprising a carrier liquid; a dispersant; and a chemical hydride for use in a hydrogen generator. The carrier liquid includes a mineral oil, e.g., a light mineral oil and the composition is in the form of a slurry. The chemical hydride includes a light metal hydride selected from the group consisting of lithium hydride, lithium borohydride, lithium aluminum hydride, sodium hydride, sodium borohydride, sodium aluminum hydride, magnesium hydride, and calcium hydride. The dispersant comprises a triglyceride.

U.S. Pat. No. 6,733,725 to Zaluska et al describes hydrogen storage compositions derived from an $AlH_3$-based complex hydride incorporating a member selected from a metalloid such as B, C, Si, P and S, a metal such as Cr, Mn, Fe, Co, Ni, Cu, Mo, Zn, Ga, In and Sn, or a metal which forms a stable hydride such as Be, Mg, Ca, Ti, V, Y, Zr and La and a second $AlH_3$-based complex hydride.

U.S. Pat. No. 6,645,651 to Hockaday et al. describes a system of two fuel ampoules that can deliver hydrogen gas as a fuel for small hydrogen fuel cells. Hydrides such as LiH, NaH, $NaBH_4$ $CaH_2$ and $LiAlH_4$, are described as the hydrogen source and co-reactants are selected from water, alcohols, organic and inorganic acids (e.g. acetic acid, sulfuric acid), aldehydes, ketones, esters, nitrites and superacids (e.g. polyoxotungstates), and combinations thereof. A silicone rubber permeable membrane may be employed if required based on the co-reactant.

U.S. Pat. No. 5,305,714 to Sekiguchi et al. describes a fuel supply system for a hydrogen gas engine, having a metal hydride tank in which pellets or powders of a metal hydride absorbing and storing alloy are stored. The alloy may be a Ni—La alloy, a Ti—Mn alloy, a Ti—Fe alloy, a Mg—Ni alloy or a Mg—Mn alloy. The metal hydride alloy powders may be impregnated with a silicone oil to avoid scattering of the metal hydride powder particles.

However, none of these references discloses or suggests a method to stabilize metal borohydride salts, especially highly reactive, pyrophoric and volatile borohydrides, which may render the stabilized composition available for use as a fuel or hydrogen generator.

BRIEF SUMMARY OF THE INVENTION

Surprisingly and unexpectedly, it has been found that metal hydrides of boron, including complex metal hydrides of boron may be stabilized in a composition containing a polyalkylsiloxane and an amorphous fumed silica. This and other objects have been achieved according to the present invention, a first embodiment of which includes a composition, comprising: a metal borohydride salt; and a mixture of a polyalkyl siloxane and an amorphous fumed silica.

In a highly preferred embodiment, the invention provides a stabilized composition of aluminum triborohydride and a mixture of a polyalkyl siloxane and an amorphous fumed silica.

In further preferred embodiments, a metal borohydride salt, specifically, aluminum triborohydride is stabilized in the presence of a mixture of a polydimethylsiloxane and an amorphous fumed silica.

In another preferred embodiment, the present invention provides a method to prepare a composition of a stabilized metal borohydride salt which includes solid state synthesis of the metal borohydride; and stabilizing the synthesized metal borohydride with a mixture of a polyalkylsiloxane and an amorphous fumed silica.

In a further preferred embodiment, the invention provides a method to prepare a stabilized composition of aluminum triborohydride by solid state synthesis and stabilizing the aluminum triborohydride with a mixture of a polyalkylsiloxane and an amorphous fumed silica.

In a specific and highly preferred embodiment, the present invention provides a method to prepare a stabilized composition of aluminum triborohydride wherein the aluminum triborohydride is prepared by a solid state synthesis and stabilized in the presence of a mixture of polydimethylsiloxane and an amorphous fumed silica.

DETAILED DESCRIPTION OF THE PREFERRED EMBODIMENTS

Metal borohydrides, including complex metal borohydrides are of interest as a high energy fuel. Metal borohydrides of interest include lithium borohydride, sodium borohydride and magnesium borohydride, while complex metal borohydrides include aluminum borohydride, titanium borohydride and zirconium borohydride. However, such materials, especially the complex metal borohydrides may be highly volatile, and/or pyrophoric in air and therefore must be stabilized to air at normal temperatures to be efficiently utilized as a fuel. Various methods to utilize such materials are described in the above paragraphs. However, none of the references describe a method to stabilize hydrides of boron in the presence of ambient air and at normal temperatures in such a manner so as to render these materials potentially viable as hydrogen energy fuels.

In investigation of complex metal borohydrides, the inventors have surprisingly discovered that a metal borohydride, especially a complex metal borohydride such as aluminum triborohydride, titanium borohydride and zirconium borohydride may be stabilized in a liquid or gel form in the presence of a mixture of a polyalkylsiloxane and an amorphous fumed silica.

In a first embodiment of the invention, a composition, comprising: a metal borohydride salt, especially aluminum triborohydride, titanium borohydride and zirconium borohydride and a mixture of a polyalkyl siloxane and an amorphous fumed silica, which is stable to air and ambient temperatures is provided.

The synthesis of complex metal borohydrides is generally described in an article by Schlesinger, Brown and Hyde (J. Am. Chem. Soc.: 75, 209, 1953) while the synthesis of aluminum triborohydride according to the following equation is detailed in the same article:

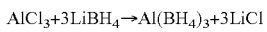

$$AlCl_3 + 3LiBH_4 \rightarrow Al(BH_4)_3 + 3LiCl$$

Aluminum triborohydride is a highly volatile and pyrophoric liquid which may be isolated and purified on a high vacuum line and then condensed under liquid nitrogen. The solid components are mixed as powders in a reaction vessel at a temperature ranging from 50 to 130° C. A molar ratio of the lithium borohydride to the aluminum chloride may be from 1/2 to 3/1. When the lithium borohydride is used in a two fold excess, aluminum triborohydride may be obtained in a 94% yield of theory. In this discussion, the terms aluminum triborohydride and aluminum borohydride are used interchangeably and both refer to the material of formula: $Al(BH_4)_3$.

According to the invention, the complex metal borohydride may be prepared and subsequently stabilized by a composition containing a polyalkyl siloxane and an amorphous fumed silica. For example, the aluminum borohydride vapor may be condensed into a receiver containing a mixture of a polyalkyl siloxane and an amorphous fumed silica or the vapor absorbed into a composition containing the polyalkyl siloxane and amorphous fumed silica. The mixture may further contain a hydroxyterminated dialkyl siloxane.

The polydialkyl siloxane according to the invention is a material of formula (I):

$$[Si(R)_2O]n$$

wherein R may be methyl, ethyl, propyl or butyl. Polydimethyl siloxane, where R is a methyl group, may be especially preferred. Such materials are commercially available or readily prepared by conventionally known methods. The value of n in formula (I) may be varied to provide a composition which is liquid, gel or solid as is conventionally known in the art.

In a highly preferred embodiment, the invention provides a stabilized composition of aluminum borohydride, titanium borohydride or zirconium borohydride and a mixture of a polyalkyl siloxane and an amorphous fumed silica.

In further preferred embodiments, a metal borohydride salt, specifically, aluminum borohydride is stabilized in the presence of a mixture of a polydimethylsiloxane and an amorphous fumed silica. Optionally, the mixture may contain hydroxy terminated dimethyl siloxane.

The mixture of a polydimethylsiloxane and an amorphous fumed silica may be a commercially available silicone high vacuum grease such as Dow Corning vacuum grease or any grease composition containing a polydimethylsiloxane, an amorphous fumed silica and other components which are not reactive to metal borohydride salts.

In another preferred embodiment, the present invention provides a method to prepare a composition of a stabilized metal borohydride salt which includes solid state synthesis of the metal borohydride; and stabilizing the synthesized metal borohydride with a mixture of a polyalkylsiloxane and an amorphous fumed silica.

In a further preferred embodiment, the invention provides a method to prepare a stabilized composition of aluminum triborohydride by solid state synthesis and stabilizing the aluminum borohydride with a mixture of a polyalkylsiloxane and an amorphous fumed silica.

In a specific and highly preferred embodiment, the present invention provides a method to prepare a stabilized composition of aluminum borohydride wherein the aluminum borohydride is prepared by a solid state synthesis and stabilized in the presence of a mixture of polydimethylsiloxane and an amorphous fumed silica. The mixture may optionally contain hydroxy terminated dimethyl siloxane.

The stabilized aluminum borohydride may be in the form of a liquid or a gel depending on the relative percent composition of the mixture. A content of the polydimethylsiloxane in the mixture may be from 50 to 95 weight % of the polydimethylsiloxane-amorphous fumed silica mixture. This range includes all values and subvalues therein between and preferably includes 50 to 85 weight %, more preferably 50 to 75 weight % and most preferably 50 to 70 weight %. The content of the optional hydroxy terminated dimethyl siloxane may be as high as 15 weight % of the polydimethylsiloxane-amorphous fumed silica mixture, preferably as high as 13 weight % and most preferably as high as 10 weight %. When present, the hydroxy terminated dimethyl siloxane may be at least 2 weight % of the mixture. The content of the amorphous silica is preferably from 5 to 25 weight %, more preferably 6 to 20 weight % and most preferably 7 to 13 weight %. As understood by one of skill in the art the total of the % weight values of the components cannot exceed 100%, but may be varied within the above ranges as necessary to prepare a stabilized aluminum borohydride having differing physical properties.

The content of the stabilized aluminum borohydride may be from 2 to 50 weight %, preferably 2 to 25 weight % and most preferably 2 to 20 weight % of the stabilized aluminum borohydride mixture.

The stabilized metal borohydride composition of the present invention is stable to air and may be suitably treated to generate hydrogen. Suitable treatment may include hydrolysis and/or thermal treatment. Because of its stability, the composition may be suitably stored and transported to serve as a fuel source. Thus the stabilized compositions may be utilized as fuels for various vehicles as well as portable electronic devices. In the preferred embodiment of the invention, stabilized aluminum borohydride may be particularly effective as a fuel source due to its high gravimetric hydrogen density in comparison to conventional systems.

The invention claimed is:

1. A composition, comprising:
   i) a metal borohydride salt of Formula (II):

$$M(BH_4)_x \qquad (II)$$

wherein M is a metal selected from the group consisting of aluminum, titanium, and zirconium; and x is an integer from 3-4;
   ii) a polydialkylsiloxane selected from the group consisting of polydimethylsiloxane, polydiethylsiloxane, polydipropylsiloxane, and polydibutylsiloxane; and
   iii) an amorphous fumed silica.

2. The composition according to claim 1, wherein the polydialkylsiloxane is polydimethylsiloxane and M in Formula (II) is aluminum.

3. The composition according to claim 2, wherein the composition is a liquid or a gel and a content of the aluminum borohydride salt is from 2 to 50 weight % of a total weight of the composition.

4. The composition according to claim 2, further comprising a hydroxy terminated polydimethylsiloxane.

5. The composition according to claim 2, wherein a content of the polydimethylsiloxane is from 50 to 95 weight % of a total weight of the composition and a content of the amorphous fumed silica is from 5 to 25 weight % of a total weight of the composition, with the proviso that the total weight % of the polydimethylsiloxane and the amorphous fumed silica cannot be greater than 98 weight % of the composition.

6. The composition according to claim 4, wherein a content of the polydimethylsiloxane is from 50 to 95 weight % of a total weight of the composition, and a content of the amorphous fumed silica is 5 to 25 weight %, with the proviso that the a total weight % of the polydimethylsiloxane and the amorphous fumed silica cannot be greater than 98 weight % of the composition.

7. A method for preparation of the composition according to claim 1, comprising: solid state synthesis of the metal borohydride salt; and stabilizing the synthesized metal borohydride salt in a mixture comprising the polydialkylsiloxane and the amorphous fumed silica.

8. The method according to claim 7, further comprising:
   condensing the synthesized metal borohydride into a container having a mixture comprising the polydialkylsiloxane and the amorphous fumed silica.

9. The method according to claim 7, wherein the stabilized mixture of the metal borohydride salt, the polydialkylsiloxane and the amorphous fumed silica is a liquid or a gel.

10. A method of stabilizing the metal borohydride salt of claim 1 from decomposition, the method comprising: dissolving or dispersing the metal borohydride salt in a composition comprising the polydialkylsiloxane and the amorphous fumed silica.

11. The method according to claim 10, wherein M in Formula (II) is aluminum.

12. The method according to claim 10, wherein the polydialkylsiloxane is polydimethylsiloxane.

13. The method according to claim 12, further comprises adding a hydroxy terminated dimethylsiloxane.

* * * * *